(12) United States Patent
Pfletschinger

(10) Patent No.: US 8,503,552 B2
(45) Date of Patent: Aug. 6, 2013

(54) METHOD AND DIGITAL COMMUNICATION DEVICE FOR RECEIVING DATA USING QAM SYMBOLS

(75) Inventor: Stephan Pfletschinger, Castelldefels (ES)

(73) Assignee: Fundacio Centre Tecnologic de Telecomunicacions de Catalunya (ES)

( * ) Notice: Subject to any disclaimer, the term of this patent is extended or adjusted under 35 U.S.C. 154(b) by 152 days.

(21) Appl. No.: 12/937,582

(22) PCT Filed: Apr. 15, 2008

(86) PCT No.: PCT/EP2008/054541
§ 371 (c)(1),
(2), (4) Date: Oct. 25, 2010

(87) PCT Pub. No.: WO2009/127243
PCT Pub. Date: Oct. 22, 2009

(65) Prior Publication Data
US 2011/0038406 A1 Feb. 17, 2011

(30) Foreign Application Priority Data
Apr. 14, 2008 (ES) .................................. 200801062

(51) Int. Cl.
*H04K 1/10* (2006.01)
*H04L 5/16* (2006.01)
*H03F 3/68* (2006.01)

(52) U.S. Cl.
USPC ............................. 375/260; 375/231; 330/107

(58) Field of Classification Search
USPC ................... 375/260, 231; 330/107
See application file for complete search history.

(56) References Cited

U.S. PATENT DOCUMENTS

| | | | | |
|---|---|---|---|---|
| 2,209,955 | A * | 8/1940 | Black | 330/107 |
| 3,729,576 | A * | 4/1973 | Court | 380/206 |
| 3,980,973 | A * | 9/1976 | Hecken | 333/28 R |
| 4,061,978 | A * | 12/1977 | Motley et al. | 375/232 |
| 5,157,698 | A * | 10/1992 | Hespelt et al. | 375/354 |
| 5,265,151 | A * | 11/1993 | Goldstein | 379/93.32 |
| 5,913,186 | A * | 6/1999 | Byrnes et al. | 704/204 |
| 6,078,626 | A | 6/2000 | Ramesh | |
| 6,263,077 | B1 * | 7/2001 | Zuranski et al. | 379/406.08 |
| 6,445,733 | B1 * | 9/2002 | Zuranski et al. | 375/231 |
| 7,653,153 | B2 * | 1/2010 | Tosato et al. | 375/341 |
| 2003/0021341 | A1 * | 1/2003 | Vigil et al. | 375/240.01 |
| 2005/0175122 | A1 * | 8/2005 | Nefedov et al. | 375/323 |

FOREIGN PATENT DOCUMENTS
GB 2388760 A 11/2003

OTHER PUBLICATIONS

International Search Report PCT/EP2008/054541; Dated Dec. 3, 2010.
David Bellver, "Codigos BICM de Complejidad Reducida con Decodificacion Iterativa y codigo Interno", Simposio Nacional de la Union Cientifica International de Radio (U.R.S.I), Sep. 2005.

(Continued)

*Primary Examiner* — Leon-Viet Nguyen
*Assistant Examiner* — Sarah Hassan
(74) *Attorney, Agent, or Firm* — Cantor Colburn LLP (57) ABSTRACT

A digital communication system which applies channel coding and QAM modulation, where in QAM, at the transmitter, a number Q of bits is mapped to one QAM symbol, which is transmitted over the channel, at the receiver side, for each QAM symbol, a de-mapping is performed in order to obtain an L-value for each bit which corresponds to the QAM symbol, such that these L-values provide not only an estimation of the transmitted bits but also give information about their reliability.

18 Claims, 8 Drawing Sheets

OTHER PUBLICATIONS

Giuseppe Caire, "Bit-Interleaved Coded Modulation", IEEE Transactions on Information Theory, vol. 44, No. 3, May 1998. pp. 927-946.

Xiadong Li, "Bit-Interleaved coded modulation with iterative decoding using soft feedback", Electronic Letters, May 1998, vol. 34. No. 10, pp. 942-943.

Stephan Pfletschinger, "A Low-Complexity MIMO System with Soft Interference Mitigation".

Stephan Pfletschinger, "Error Floor Removal for Bit-Interleaved Coded Modulation with Iterative Detection", IEEE Transactions on Wireless Communications, vol. 5, No. 11, Nov. 2006, pp. 3174-3181.

Patrick Robertson, "A Comparison of Optimal and Sub-Optimal MAP Decoding Algorithms Operating in the Log Domain", Institute for Communications Technology, German Aerospace Research, 1995, pp. 1009-1013.

Leszek Szczecinski, "Probability Density Functions of Reliabilty Metrics for 16-QAM-Based BICM Transmission in Rayleigh Channel", IEEE Communications Society, pp. 1012-1017.

M. Surendra Raju, "LLR based BER Analysis of Orthogonal STBCs using QAM on Rayleigh Fading Channels" IEEE 2004, pp. 2008-2011.

Stephan Brink, "Iteratice De Mapping and Decoding for Multilevel Modulation", Globecomm, Sydney, Nov. 1998. pp. 579-584.

* cited by examiner

METHOD AND DIGITAL COMMUNICATION DEVICE FOR RECEIVING DATA USING QAM SYMBOLS

TECHNICAL FIELD

The present invention relates generally to the field of digital data communications, more particularly, to demapping techniques of Quadrature Amplitude Modulation (QAM) symbols, and can be applied to, but not limited to, multiple-antenna wireless communication systems.

BACKGROUND

In current digital communication systems, for example digital cellular telephony, digital radio communication systems or wireline transmission systems, the transmitted digital messages are distorted by the channel and affected by noise and interference. The received data at the receiver has to be processed adequately in order to recover the sent messages.

In the transmitter of a digital communication system, information bits are mapped onto complex symbol constellations, such as 16-point Quadrature Amplitude Modulation (16-QAM), 64-point Quadrature Amplitude Modulation (64-QAM), etc. Higher order modulations, for instance 256-point Quadrature Amplitude Modulation (256-QAM) and higher, are required for spectrally efficient communication systems.

The corresponding inverse operation carried out in the receiver is known as demapping, which comprises computing a metric for each information bit to be input to a decoder.

Figure 1:
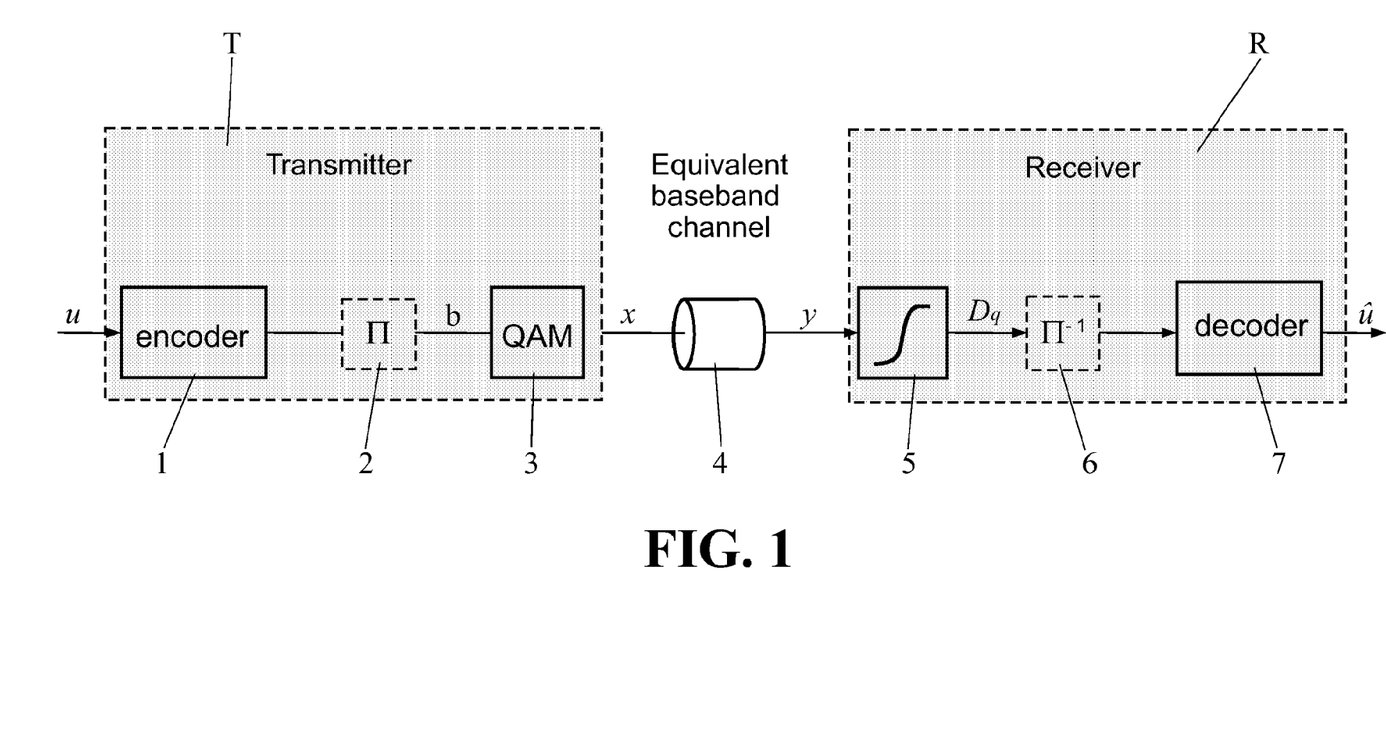
FIG. 1 is a block diagram of a digital communication system as known in the state of the art, consisting basically of a transmitter, communication channel and a receiver.

FIG. 1 shows a simplified model of a digital communication system, which is valid for the vast majority of modern systems for digital data transmission. A sequence of information bits (u), forming a message which is input to a transmitter (T), is first encoded by a FEC encoder (1) for Forward Error Correction and this yields a sequence of coded bits (c) which, in turn, is fed into an interleaver (2). The interleaver (2) permutes the sequence of coded bits (c) and feeds them to a QAM mapper (3), which transforms a determined number (Q) of bits into a QAM symbol (x) to be sent by the transmitter (T).

The QAM mapper (3) maps a binary vector $b=(b_1, \ldots, b_Q)$ of Q elements to one QAM symbol (x) taken out of a discrete alphabet $C_x$, i.e. x=map(b) and that is:

$$b=(b_1, \ldots, b_Q) \to x \in C_x \quad \text{(equation 1)}$$

where $b_q \in \{0,1\}$ are binary values and $C_x$ represents the QAM constellation, which contains $2^Q$ complex-valued constellation points.

The mapping is one-to-one, i.e. each point in the constellation $C_x$ is uniquely identified by a bit vector and vice versa. This relationship between the bit vectors b and the constellation points $x \in C_x$ is also called labelling.

The effect of the transmission filter and digital-analog conversion, the physical channel and the receiver filter including analog-digital conversion is represented by an equivalent baseband channel (4).

A coded and modulated signal according to the QAM scheme used in the transmitter (T) is sent through a communications medium to a receiver (R).

Assuming the equivalent baseband channel (4) is defined by a channel coefficient h and the noise in the communications medium is modelled as Additive White Gaussian, the received signal can be expressed by a series of one or more received QAM symbols (y) being:

$$y = h \cdot x + w \quad \text{(equation 2)}$$

where w is a complex circular Gaussian distributed random variable with zero mean and variance $N_0$. In other words, the real and imaginary part of w are Gaussian i.i.d. (independent and identically distributed) with zero mean and variance $N_0/2$.

This means that the transmitted QAM symbol x is attenuated by a channel coefficient h and is corrupted by additive noise w. If the channel coefficient h changes over time, h refers to a fading channel. If h is constant over time, then the channel reduces to the simpler AWGN channel (Additive White Gaussian Noise). The following considerations apply to both cases.

The conditional probability density function of the channel is hence given by:

$$p(y \mid x) = \frac{1}{\pi N_0} \exp\left(-\frac{|y - h \cdot x|^2}{N_0}\right) \quad \text{(equation 3)}$$

The received signal is demodulated by using a demapper (5) and a deinterleaver (6) to produce an information stream which is subsequently decoded in a channel decoder (7), which is a FEC decoder, in order to obtain another sequence of information bits (û) forming the received message.

The receiver (R) tries to recover all the information bits (u) of the transmitted message. A simple but suboptimum solution is to perform in the receiver (R) the same steps as in the transmitter (T), but in reverse order. This simple strategy first finds for every noisy received QAM symbol (y) the corresponding constellation point and bit vector. However, this "hard demapping" discards information which might be exploited by the FEC decoder. Therefore, in modern receivers to improve coding performance, the demapper (5) provides a so-called "soft information" on each bit. This soft information provides not only an indication on the value of each bit but also an estimation of its reliability. The most common form to define this soft information is the L-value ($D_q$), which indicates the logarithm of a relative probability that a bit in the source bit stream has a particular value:

$$D_q = \ln \frac{P[b_q = 1 \mid y]}{P[b_q = 0 \mid y]} \quad \text{(equation 4)}$$

where $b_q$ denotes the q-th bit in the bit vector b [for reference, see "Códigos BICM De Complejidad Reducida Con Decodificación Iterativa Y Código Interno" by S. Pfletschinger, M. Navarro and D. Bellver, issued at XX Simposio Nacional de la URSI, 2005, and available in w3.iec.csic.es/URSI/articulos_gandia_2005/articulos/CMo1/560.pdf; see also "A low-complexity MIMO system with soft interference mitigation" by S. Pfletschinger and M. Navarro, Global Telecommunications Conference, 2004, IEEE Volume 1, Pages 396-400].

From the L-value ($D_q$), the a posteriori probability $P[b_q=1|y]$ can be gleaned directly, and vice versa. By applying some basic equations from probability theory, the L-value ($D_q$) for the q-th bit ($b_q$) in the bit vector (b) can be written as:

$$D_q = \ln \frac{P[b_q = 1]}{P[b_q = 0]} + \ln \frac{\sum_{\hat{b} \in B_{q,1}} p(y \mid \hat{b})}{\sum_{\hat{b} \in B_{q,0}} p(y \mid \hat{b})} \quad \text{(equation 5)}$$

where $B_{q,1}=\{b:b_q=1\}$ denotes the set of bit vectors which have a value "one" at position q and $B_{q,0}=\{b:b_q=0\}$ is the set of bit vectors with a "zero" in their q-th position.

The first term in equation 5 is the a priori L-value $$A_q = \ln\frac{P[b_q=1]}{P[b_q=0]},$$

which in the following is assumed to be equal to zero. This assumption is tantamount to saying that "ones" and "zeros" are equiprobable, and is fulfilled at the output of any reasonable designed source or channel coding scheme. In any case, as long as the probabilities are not available at the decoder (7), equiprobable bits have to be assumed.

Hence, assuming $P[b_q=1]=P[b_q=0]$ and with equation 3 the L-value ($D_q$) can be obtained as:

$$D_q = \ln\frac{\sum_{\hat{b}\in B_{q,1}} \exp\left(-\frac{|y-h\cdot\text{map}(\hat{b})|^2}{N_0}\right)}{\sum_{\hat{b}\in B_{q,0}} \exp\left(-\frac{|y-h\cdot\text{map}(\hat{b})|^2}{N_0}\right)} \quad \text{(equation 6)}$$

With the definition of the Jacobian logarithm $$jaclog(x_i) = \ln\left(\sum_{i=1}^{n} \exp(x_i)\right),$$

equation 6 can be written as $$D_q = \underset{\hat{b}\in B_{q,1}}{jaclog}\left(-\frac{|y-h\cdot\text{map}(\hat{b})|^2}{N_0}\right) - \underset{\hat{b}\in B_{q,0}}{jaclog}\left(-\frac{|y-h\cdot\text{map}(\hat{b})|^2}{N_0}\right) \quad \text{(equation 7)}$$

An approximation, which is often applied for the calculation of L-values, is the max-log approximation [see, e.g., "A comparison of optimal and sub-optimal MAP decoding algorithms operating in the log domain", by P. Robertson et al., IEEE International Communications Conference, Seattle (USA), June 1995] as follows:

$$jac\log(x_1,\ldots,x_n)\approx\max\{x_1,\ldots,x_n\} \quad \text{(equation 8)}$$

This leads to $$D_q = \frac{1}{N_0}\left(\min_{x\in X_{q,0}} |y-h\cdot x|^2 - \min_{x\in X_{q,1}} |y-h\cdot x|^2\right) \quad \text{(equation 9)}$$

where $X_{q,1}=\{x=\text{map}(b):b_q=1\}$ and $X_{q,0}=\{x=\text{map}(b):b_q=0\}$.

The calculation of the L-value ($D_q$) according to equation 9 is conceptionally very simply, but for large constellations it is computationally costly since it requires the search of the minimum in the sets $X_{q,1}$ and $X_{q,0}$. For instance, in a 64-QAM constellation each one of these sets consists of 32 points, while for a 1024-QAM constellation, which carries 10 bits per symbol, each set has 512 points.

The methods disclosed in U.S. Pat. No. 6,078,626 and GB2388760 are alternatives for the computation and implementation of equation 9, but they are aimed at QAM constellation of moderate size (e.g. 16-QAM, 64-QAM) and do not result efficient for higher-order modulations. Both U.S. Pat. No. 6,078,626 and GB2388760 describe methods for calculating the L-value that require for a previous step of distinction of different cases, depending on the level of the real and imaginary part of the input signal. For higher-order modulations, the number of case distinctions and so the complexity increase.

So far, in existing digital communications systems, the calculation of the L-values according to equation 9 comes at a high computational cost, especially for higher order modulations, which are required for spectrally efficient communication. It is therefore desirable to decrease the computational complexity of the calculation of the "soft information" required by the demapper, and thus to facilitate the implementation of soft demapping in real-time applications.

BRIEF SUMMARY

The invention simplifies the computing and implementation of the L-value ($D_q$) defined before, without sacrificing accuracy and with the aim to be well-suited for modern, spectral-efficient and high-rate communication systems, in special to be applicable for 64-QAM, 256-QAM, 1024-QAM and so forth.

More precisely, after receiving the signal and processing it, including its conversion to baseband and analog-digital conversion, and having estimated the noise power ($N_0$) and channel coefficient (h) that characterize the communication channel, the method proposed here introduces a step of pre-equalization of the baseband signal. Thus, the received symbol (y) is pre-equalized by $$z = \frac{y}{h} \quad \text{(equation 10)}$$

Hence and from equation 9, the L-value ($D_q$) is calculated as $$D_q = \frac{|h|^2}{N_0}\left(\min_{x\in X_{q,0}} |z-x|^2 - \min_{x\in X_{q,1}} |z-x|^2\right) \quad \text{(equation 11)}$$

with the definitions given before for the transmitted symbol (x) and the sets $X_{q,1}$ and $X_{q,0}$, which constitute subconstellations out of a $2^Q$-QAM constellation ($C_x$), being $q\in\{1,2,\ldots,Q\}$ the bit position.

Since the pre-equalized received information (z) is complex-valued, it can be expressed with real part (z') and imaginary part (z'') as $$z=z'+jz'', \quad \text{(equation 12)}$$

where $j=\sqrt{-1}$ denotes the imaginary unit.

In the following, the constellation ($C_x$) can be written in the form:

$$C_x=\{2n+1+j(2m+1):n,m=-N, N+1,\ldots, N-1\} \quad \text{(equation 13)}$$

where $N=2^{Q/2-1}$ and Q is an even integer representing the number of bits per QAM symbol.

In order to reduce the computational complexity of the L-value calculation specified in equation 11, which is the aforementioned goal of this invention, a series of steps are performed and described here as follows.

These steps have to be performed for each bit position q with $q=1, 2, \ldots, Q$ and for both subconstellations $X_{q,0}$ and $X_{q,1}$.

The following steps also apply to constellations which can be brought into the form of equation 13 by multiplication with a non-zero complex factor.

Step 1: Decomposition into Real and Imaginary Parts

In analogy to equation 12, the variable x can be decomposed into real and imaginary part: $x=x'+jx''$. Then, equation 11 can be re-written as:

$$D_q = \frac{|h|^2}{N_0}\left(\min_{x \in X_{q,0}} \{(z' - \text{Re}(x))^2 + (z'' - \text{Im}(x))^2\} - \min_{x \in X_{q,1}} \{(z' - \text{Re}(x))^2 + (z'' - \text{Im}(x))^2\}\right) \quad \text{(equation 14)}$$

The sets containing the real or imaginary parts of the subconstellations $X_{q,0}$ and $X_{q,1}$ can be defined respectively as $X'_{q,i}$ and $X''_{q,i}$ by the expressions:

$$X'_{q,i} = \{Re(x) : x \in X_{q,i}\}, X''_{q,i} = \{Im(x) : x \in X_{q,i}\}, i=0,1. \quad \text{(equation 15)}$$

In many practically relevant cases, the subconstellations fulfil one of the following conditions:

Condition A: $X'_{q,0} = X'_{q,1}$

Condition B: $X''_{q,0} = X''_{q,1}$ (equation 16)

In case of satisfying any of these two conditions, either condition A either condition B, equation 11 can be simplified to:

Condition A: $\tilde{D}_q = \left(\min_{x'' \in X''_{q,0}} |z'' - x''|\right)^2 - \left(\min_{x'' \in X''_{q,1}} |z'' - x''|\right)^2$ (equation 17)

Condition B: $\tilde{D}_q = \left(\min_{x' \in X'_{q,0}} |z' - x'|\right)^2 - \left(\min_{x' \in X'_{q,1}} |z' - x'|\right)^2$ and $$D_q = \frac{|h|^2}{N_0}\tilde{D}_q, \quad q = 1, 2, \ldots, Q \quad \text{(equation 18)}$$

This is a significant simplification because while the sets $X_{q,i}$ have $2^{Q-1}$ elements, the relevant sets $X'_{q,i}$ or $X''_{q,i}$, which are the sets applied in equation 17 depending on whether condition A or condition B is satisfied, only have $2^{Q/2-1}$ elements.

For description of the next steps, it can be assumed that condition B is fulfilled (it is straightforward to consider condition A).

Step 2: Exploit Symmetry of Subconstellations

Since the constellation $C_x$ is of the form given in equation 13, the set of the real parts $X'_{q,i}$ of the subconstellation is given by $$X'_{q,i} = \{-2N+1, -2N+3, \ldots, -1, 1, \ldots, 2N-1\},$$
$$N = 2^{\frac{Q}{2}-1}, \quad i \in \{0, 1\}$$

This set $X'_{q,i}$ is symmetric if it can be written in the form $X'_{q,i} = \{-m, -m+2, \ldots, -n-2, -n, n, n+2, \ldots, m-2, m\}$, where n,m are odd, positive integers with $m \geq n$. Hence a set $\tilde{X}_{q,i}$ can be defined as:

$$\tilde{X}_{q,i} = \begin{cases} \{n, n+2, \ldots, m-2, m\} & \text{if } X'_{q,i} \text{ is symmetric} \\ X'_{q,i} & \text{otherwise,} \end{cases}$$

And defining a variable $\xi$ as a real number whose value is given by:

$$\xi = \begin{cases} |z'| & \text{if } X'_{q,i} \text{ is symmetric} \\ z' & \text{otherwise} \end{cases}$$

thus for all cases it can be written:

$$\min_{x' \in X'_{q,i}} |z' - x'| = \min_{x \in \tilde{X}_{q,i}} |\xi - x| \quad \text{(equation 19)}$$

Step 3: Partition into Subsets

The set of the real parts $X'_{q,i}$ can be partitioned into disjoint subsets $B_k$ such that $X'_{q,i} = \cup_{k=1}^{K} B_k$ and for each subset holds $B_k = \{n_k, n_k+2, \ldots, m_k-2, m_k\}$ where $n_k, m_k$ are odd integers.

The minimization in equation 19 can hence be re-written as:

$$\min_{x \in \tilde{X}_{q,i}} |\xi - x| = \min_{k=1,\ldots,K} \left\{\min_{x \in B_k} |\xi - x|\right\} \quad \text{(equation 20)}$$

In many cases, the inner minimization in equation 20 can be simplified:

$B_k = \{1, 3\}$ and $\xi \geq 0$:

$$\min_{x \in B_k} |\xi - x| = \max\{d(\xi), \xi - 3\} \quad \text{(equation 21)}$$

$B_k$ has an even number of elements. For this case we have $$\min_{x \in B_k} |\xi - x| = \max\left\{d(\xi), \left|\xi - \frac{n_k + m_k}{2}\right| - \frac{m_k - n_k}{2}\right\} \quad \text{(equation 22)}$$

where the function $d(\xi)$ denotes the distance between the real number $\xi$ and the closest odd integer and is defined by $$d(\xi) = \left|2\left\lfloor\frac{\xi}{2}\right\rfloor + 1 - \xi\right| \quad \text{(equation 23)}$$

Note that this function is symmetric, i.e. $d(\xi) = d(-\xi)$ and hence $d(|\xi|) = d(\xi)$.

Step 4: Further Simplifications

If the term $|\xi-1|$ appears among others in a minimization operation, the absolute value can be omitted, i.e.:

$$(\min\{|\xi-1|, |\xi-a_1|, \ldots, |\xi-a_n|\})^2 = (\min\{\xi-1, |\xi-a_1|, \ldots, |\xi-a_n|\})^2 \quad \text{(equation 24)}$$

for $a_1, a_2, \ldots, a_n \in \{2, 3, 4, \ldots\}$ and $\xi \geq 0$.

For some cases, the following formula is useful to further reduce the computational complexity:

$$\min\{\max\{d, a_1\}, \max\{d, a_2\}, \ldots, \max\{d, a_n\}\} = \max\{d, \min\{a_1, a_2, \ldots, a_n\}\} \quad \text{(equation 25)}$$

The computational complexity of the L-value calculation according to equation 11 can be significantly reduced by application of these four steps. Note that these steps have to be applied only to obtain a simpler implementation of the demapper in the receiver, i.e. only during the development phase of the demapper and not during its operation.

The above steps hold for any constellation of the form given in equation 13 and the described steps may therefore seem complicated. In the section "Detailed description of the invention", some examples on how these steps apply to a given QAM constellation are being shown.

Thus, an aspect of the invention is a method for receiving digital data, applicable in special to QAM symbols of high order, which uses the real or imaginary parts of the decision variable z along with their absolute values and the distance function $d(\xi)$ for computing the L-values for each bit of the symbol.

Such calculation of the L-value ($D_q$) according to equation 11, which is simplified by the above described procedure, is efficient for higher-order constellations because:

For the computation of the distance of the decision variable $\xi$ to the nearest point in the corresponding subset, said nearest point is not necessary to be determined.

In many cases, the real or the imaginary part of the subconstellations $X_{q,0}$ and $X_{q,1}$, defined after equation 9 and equation 15, are identical, i.e. one of the conditions in equation 16 is satisfied. Since the squared distance $|z-x|^2$ is the sum of the squared distances of the real and imaginary parts, one term cancels out in equation 14 and hence it is enough to compute the distance only in one dimension.

Since these subconstellations are rectangular, the boundary conditions are simple.

The subconstellations show many symmetries which can be exploited for avoiding repeated calculations and many intermediate results obtained for the L-value calculated for the first bit ($D_1$) can be re-used for computing the L-values for the rest of the bits.

More precisely, a method for receiving digital data using QAM symbols, having the QAM symbols defined in a constellation diagram, is proposed here performing the steps described below for de-mapping the received symbols (y) to provide soft-information on each bit of said received symbols (y). The received symbol (y) input to the receiving method consists of a number (Q) of bits determined by the order of the QAM modulation, having the QAM symbols defined in a constellation diagram. The proposed de-mapping has application in special for $Q \geq 6$ bits, that is, higher order QAM constellation. This method comprises the following steps:

Estimation of a noise power ($N_0$) and a channel coefficient (h) values. Equivalently, the power spectral density can be applied since its estimated value can be immediately derived from the noise power ($N_0$).

Pre-equalization of the received symbol (y) by the estimated channel coefficient (h) in order to obtain a pre-equalized signal (z), which is determined by a real part (z') and an imaginary part (z").

Computation of distances from the real or imaginary part of the pre-equalized signal (z) to the closest point of the corresponding subset using the real part (z') and the imaginary part (z") of the pre-equalized signal (z). These distances in real (d') and imaginary direction (d") are calculated by using the computationally efficient distance function $d(\xi)$ defined in equation 23 and with the simplifications described before.

Computation of soft-information by calculating for each bit of the received symbol (y) an L-value (Dq) using the pre-equalized signal (z) and the distance calculated in the previous step.

The L-values (Dq) computed for each bit are used for deinterleaving and decoding the received digital data in order to finally obtain the digitized demodulated data that conforms a received message as output of this receiving procedure.

Another aspect of the present invention refers to provide a device for receiving digital data, especially suitable in digital communication systems using high-order QAM, which implements the method described above. This digital communication device, forming part of a receiver, comprises a demodulator for converting the received symbol (y) into digitized demodulated data to output a received message (û). The digital demodulator, in turn, comprises:

a channel estimator configured to obtain a noise power ($N_0$) and a channel coefficient (h) from the received symbol (y), a demapper to obtain soft-information from each bit of the received symbol (y) suitable to be provided with a deinterleaver and a decoder.

The demapper proposed here comprises:

A pre-equalizer configured to obtain from the received symbol (y) a pre-equalized signal (z) by the channel coefficient (h), the pre-equalized signal (z) having a real part (z') and an imaginary part (z");

a distance calculation unit connected to the pre-equalizer (9) and configured to compute a distance from the real or imaginary part of the pre-equalized signal (z) to the closest point of corresponding subset, using the real part (z') or the imaginary part (z") of the pre-equalized signal (z);

a soft-information calculation unit configured to compute an L-value ($D_q$) using the pre-equalized signal (z) and the calculated distance. The L-value ($D_q$) corresponds to the q-th bit of the received symbol (y) and q=1 . . . Q, being Q the number of bits per QAM symbol of the used QAM modulation.

The main advantages and innovations of the proposed invention with respect to the prior art become apparent in the description and are summarized as follows:

1. No previous step of distinguishing the possible cases are required, as opposed to U.S. Pat. No. 6,078,626 and GB2388760, and taking into account that the number of different cases increases with the order of the modulation used, the present method gets to decrease the complexity of the L-values calculation.

2. The present invention can be applied directly to Bit-Interleaved Coded Modulation (BICM) [a definition of BICM can be found in "Bit-Interleaved Coded Modulation" by G. Caire, G. Taricco, E. Biglieri, IEEE Transactions on Information Theory, vol. 44, no. 3, May 1998], as long as no iterative processing between the demapper and the decoder is needed. On the contrary this direct application is not allowed in the solutions described in the aforementioned bibliographic references: "Error Floor Removal for Bit-Interleaved Coded Modulation with Iterative Detection" by S. Pfletschinger et al., "Bit-interleaved coded modulation with iterative decoding using soft feedback" by X. Li et al. and "Iterative demapping and decoding for multilevel modulation" by S. ten Brink. If a strong outer code or a higher-order constellation is used, the iterative demapping of the cited solutions is usually not applicable, and then the present invention does suit in such scenarios.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but just as an example of how the invention can be embodied. The drawings comprise the following figures.

DETAILED DESCRIPTION

Figure 2:
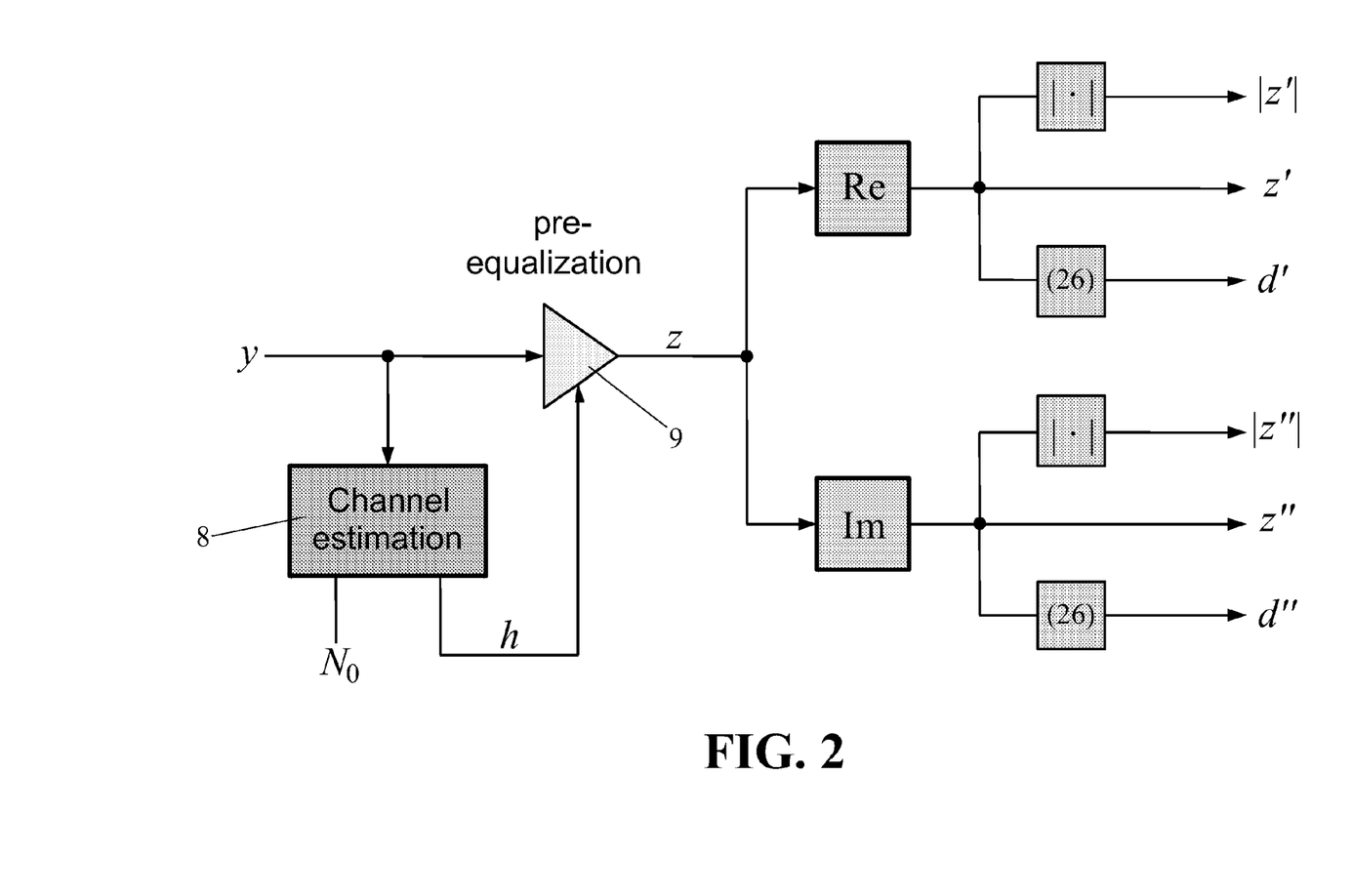
FIG. 2 is a block diagram of a part of a receiver of a digital communication system in accordance with a preferred embodiment of the invention.

Here below a practical implementation of the invention is described: FIG. 2 shows a block diagram of a device located at the receiver end of a digital communication system. The input to this device is a received symbol (y) corresponding to a number (Q) of bits and beginning from them, the device employs means for channel estimation (8) to obtain a noise power ($N_0$) as well as the channel coefficient (h), which is used in turn by a pre-equalizer (9) resulting in a pre-equalized signal (z) according to equation 10.

In the following, two examples are shown to illustrate how the steps described before can be applied to a given constellation. Since the distance function appears several times, the values of the distance in real and in imaginary directions are pre-calculated respectively as:

$$d'=d(z')=|2\lfloor z'/2 \rfloor+1-z'|, \quad d''=d(z'')=|2\lfloor z''/2 \rfloor+1-z''| \quad \text{(equation 26)}$$

After pre-equalization, the device depicted in FIG. 2 implements the computation of the variables required to calculate the L-value ($D_q$) by processing both the real and the imaginary part in the same way. The following variables are obtained: the real part (z') of the pre-equalized signal (z), the absolute value (|z'|) of said real part (z') and the distance in real direction (d'); as well as the imaginary part (z'') of the pre-equalized signal (z), its absolute value (|z''|) and the distance in imaginary direction (d''). These variables are computed in a calculation unit having means, depicted in FIG. 2 as corresponding calculation blocks: Re, Im and |·|, respectively for obtaining the real and imaginary parts of the pre-equalized signal (z) and their respective absolute values. Besides, the defined distances in real direction (d') and in imaginary direction (d'') are obtained by distance calculation means (26) applying equation 27.

Example 1

64-QAM with Gray Labelling

Figure 3:
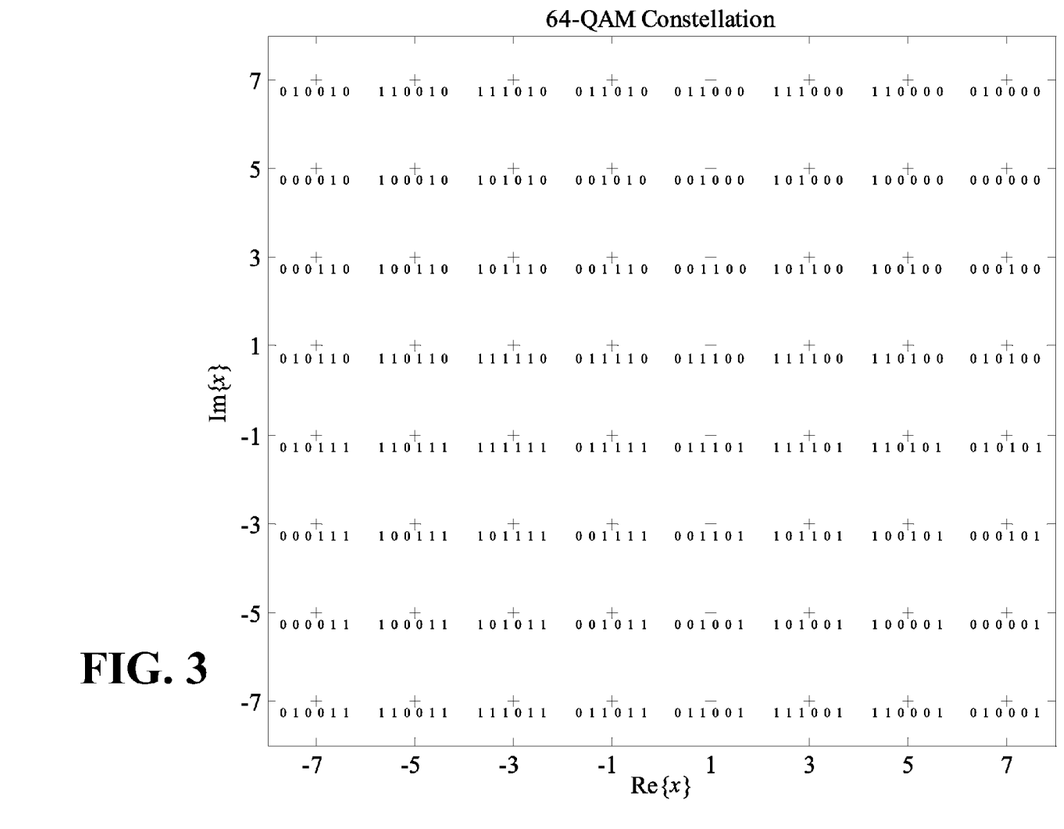
FIG. 3 shows a graphical representation of a 64-QAM constellation diagram with Gray labelling, having represented the elements of this constellation and their corresponding bit vectors expressed in binary, as an example to illustrate the computation and implementation of the L-value.

Considering a 64-QAM constellation with Gray labelling as depicted in FIG. 3, and starting with the first bit position q=1, the simplified formula for the computation of the L-value is derived following the described steps:

Step 1: For the subconstellations $X_{1,0}$ and $X_{1,1}$ corresponding to this first bit position defined from the 64-QAM constellation, their real and imaginary parts determine respectively the values of the sets, $X'_{1,i}$ and $X''_{1,i}$, i=0,1, and these values are in the present example:

$$X'_{1,0}=\{-7,-1,1,7\} \; X'_{1,1}=\{-5,-3,3,5\}$$

$$X''_{1,0}=\{-7,-5,-3,-1,1,3,5,7\} \; X''_{1,1}=\{-7,-5,-3,-1,1,3,5,7\}$$

Thus, condition B of equation 16 is satisfied and then from equation 17, a value $\tilde{D}_1$ corresponding to the first bit position can be defined as:

$$\tilde{D}_1 = \left(\min_{x' \in X'_{1,0}} |z'-x'|\right)^2 - \left(\min_{x' \in X'_{1,1}} |z'-x'|\right)^2$$

that is, only the real part of the pre-equalized signal z is processed for this L-value.

Step 2: As both $X'_{1,0}$ and $X'_{1,1}$ are symmetric, hence $\tilde{X}_{1,0}=\{1,7\}$, $\tilde{X}_{1,1}=\{3,5\}$, $\xi=|z'|$ and with equation 19 the value $\tilde{D}_1$ is obtained as:

$$\tilde{D}_1 = \left(\min_{x \in \tilde{X}_{1,0}} |\xi-x|\right)^2 - \left(\min_{x \in \tilde{X}_{1,1}} |\xi-x|\right)^2$$

Step 3: $\tilde{X}_{1,0}=\{1\}\cup\{7\}$, $\tilde{X}_{1,1}=\{3,5\}$
From equation 20, $$\min_{x \in \tilde{X}_{1,0}} |\xi-x| = \min\{|\xi-1|, |\xi-7|\}$$

and from equation 22, $$\min_{x \in \tilde{X}_{1,1}} |\xi-x| = \max\{d', |\xi-4|-1\}$$

Step 4: Since $\xi=|z'|\geq 0$, equation 24 can be applied to obtain $$\left(\min_{x \in \tilde{X}_{1,0}} |\xi-x|\right)^2 = (\min\{\xi-1, |\xi-7|\})^2$$

Hence, finally the value $\tilde{D}_1$ is computed as:

$$\tilde{D}_1=(\min\{|z'|-1,||z'|-7|\})^2-(\max\{d',||z'|-4|-1\})^2$$

For the next bit position with q=2, by performing the four steps in an analogous manner, the value $\tilde{D}_2$ corresponding to the second bit position is obtained as:

$$\tilde{D}_2=(\max\{d'',||z''|-4|-1\})^2-(\min\{|z''|-1,||z''|-7|\})^2$$

Now consider the fourth bit, i.e. q=4.

Step 1: For the subconstellations $X_{4,0}$ and $X_{4,1}$ corresponding to this fourth bit position defined from the 64-QAM constellation, the values of the sets of their real and imaginary parts are respectively:

$$X'_{4,0}=\{-7,-5,-3,-1,1,3,5,7\}\ X'_{4,1}=\{-7,-5,-3,-1,1,3,5,7\}$$

$$X''_{4,0}=\{-7,-5,5,7\}\ X''_{4,1}=\{-3,-1,1,3\}$$

Hence, condition A from equation 16 is satisfied and the value $\tilde{D}_4$ corresponding to the fourth bit position is obtained from equation 17:

$$\tilde{D}_4 = \left(\min_{x'' \in X''_{4,0}} |z''-x''|\right)^2 - \left(\min_{x'' \in X''_{4,1}} |z''-x''|\right)^2$$

Here, only the imaginary part of the pre-equalized signal z is processed.

Step 2: Both $X''_{4,0}$ and $X''_{4,1}$ are symmetric, hence $\tilde{X}_{4,0}=\{5,7\}$, $\tilde{X}_{4,1}=\{1,3\}$, $\xi=|z''|$ and with equation 19 the value $\tilde{D}_4$ is expressed as:

$$\tilde{D}_4 = \left(\min_{x \in \tilde{X}_{4,0}} |\xi-x|\right)^2 - \left(\min_{x \in \tilde{X}_{4,1}} |\xi-x|\right)^2$$

Step 3: No further partitioning is necessary.
From equation 21

$$\min_{x \in \tilde{X}_{4,1}} |\xi-x| = \max\{d(\xi), \xi-3\}$$

and from equation 22

$$\min_{x \in \tilde{X}_{4,0}} |\xi-x| = \max\{d(\xi), |\xi-6|-1\}$$

Step 4 gives no further simplification.

Hence, the value $\tilde{D}_4$ corresponding to the fourth bit position is finally computed as:

$$\tilde{D}_4=(\max\{d'',||z''|-6|-1\})^2-(\max\{d'',|z''|-3\})^2$$

Analogically, the value $\tilde{D}_3$ corresponding to the third bit position is:

$$\tilde{D}_3=(\max\{d',||z'|-6|-1\})^2-(\max\{d',|z'|-3\})^2$$

Consider now the fifth bit, i.e. q=5.
Step 1: The values of the sets of the real and imaginary parts of the subconstellations $X_{5,0}$ and $X_{5,1}$ corresponding to this fifth bit position are:

$$X'_{5,0}=\{1,3,5,7\}\ X'_{5,1}=\{-7,-5,-3,-1\}$$

$$X''_{5,0}=\{-7,-5,-3,-1,1,3,5,7\}\ X''_{5,1}=\{-7,-5,-3,-1,1,3,5,7\}$$

that is, condition B is satisfied and from equation 17, $$\tilde{D}_5 = \left(\min_{x' \in X'_{5,0}} |z'-x'|\right)^2 - \left(\min_{x' \in X'_{5,1}} |z'-x'|\right)^2$$

Step 2: Neither $X'_{5,0}$ nor $X'_{5,1}$ are symmetric.

Step 3: No further partitioning is required and from equation 22, $$\min_{x' \in X'_{5,0}} |z'-x'| = \max\{d(z'), |z'-4|-3\}$$

$$\min_{x' \in X'_{5,1}} |z'-x'| = \max\{d(z'), |z'+4|-3\}$$

which leads to the value $\tilde{D}_5$ corresponding to the fifth bit position $$\tilde{D}_5=(\max\{d',|z'-4|-3\})^2-(\max\{d',|z'+4-3\})^2$$

Analogically, for the sixth bit position the value is:

$$\tilde{D}_6=(\max\{d'',|z''-4|-3\})^2-(\max\{d'',|z''+4|-3\})^2$$

And finally, the L-value for all bit positions is obtained by equation 18.

Example 2

256-QAM with Gray Labelling

Figure 4:
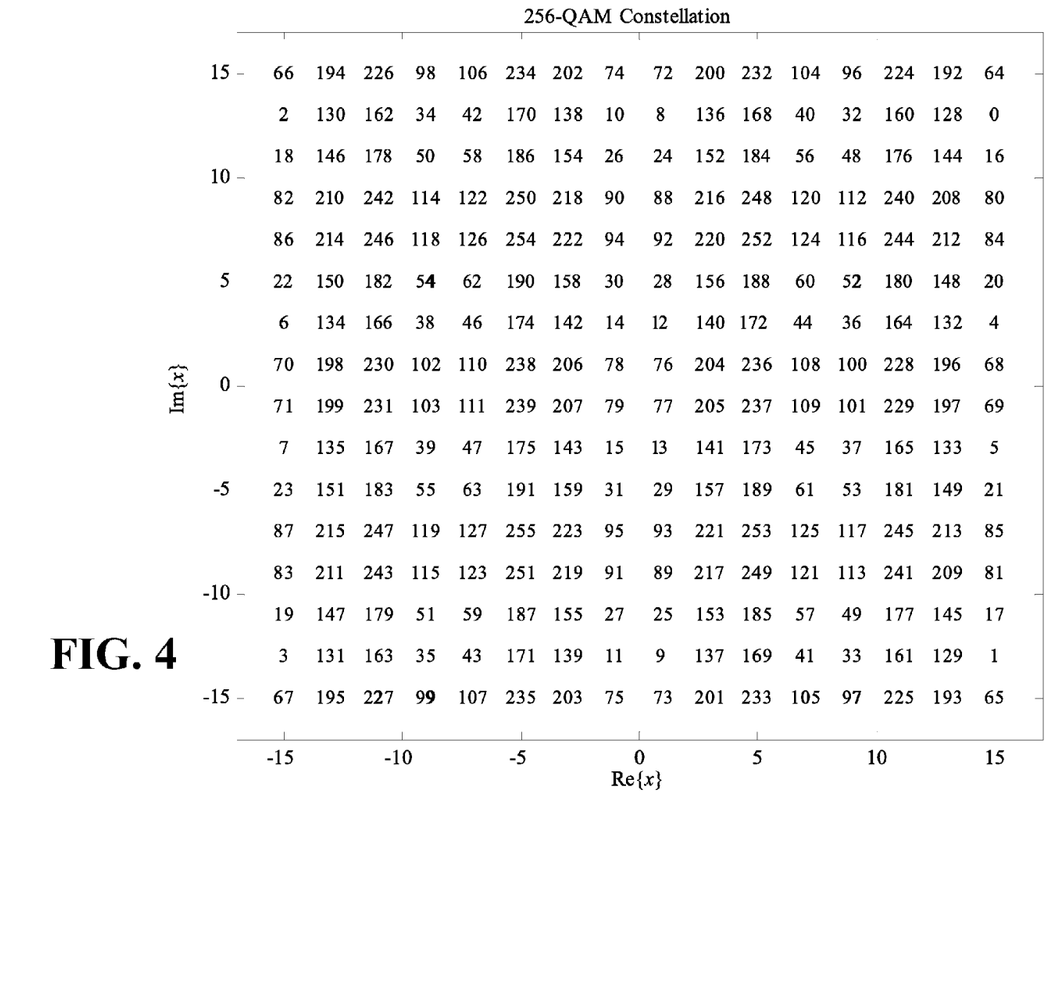
FIG. 4 shows a graphical representation of a constellation diagram for 256-QAM with Gray labelling, having represented the elements of this constellation and their corresponding bit vectors expressed with decimal values, as another example to illustrate the computation and implementation of the L-value of the invention.

Considering a 256-QAM constellation with Gray labelling as depicted in FIG. 4, and starting with the first bit position q=1, the simplified formula for the computation of the L-value is derived following the described steps:

Step 1: For the subconstellations $X_{1,0}$ and $X_{1,1}$ corresponding to this first bit position defined from the 256-QAM constellation, their real and imaginary parts determine respectively the values of the sets, $X'_{1,i}$ and $X''_{1,i}$, i=0,1, and these values are in the present example:

$$X'_{1,0}=\{-15,-9,-7,-1,1,7,9,15\}\ X'_{1,1}=\{-13,-11,-5,-3,3,5,11,13\}$$

$$X''_{1,0}=X''_{1,1}=\{-15,-13,-11,-9,-7,-5,-3,-1,1,3,5,7,9,11,13,15\}$$

which means that condition B is satisfied. Hence $$\tilde{D}_1 = \left(\min_{x' \in X'_{1,0}} |z'-x'|\right)^2 - \left(\min_{x' \in X'_{1,1}} |z'-x'|\right)^2$$

Step 2: Both $X'_{1,0}$ and $X'_{1,1}$ are symmetric, hence $\tilde{X}_{1,0}=\{1,7,9,15\}$, $\tilde{X}_{1,1}=\{3,5,11,13\}$, $\xi=|z'|$ and with equation 19 the value $\tilde{D}_1$ corresponding to the first bit position is:

$$\tilde{D}_1 = \left(\min_{x \in \tilde{X}_{1,0}} |\xi-x|\right)^2 - \left(\min_{x \in \tilde{X}_{1,1}} |\xi-x|\right)^2$$

Step 3: Without further partitioning $\tilde{X}_{1,0}$, the following is obtained:

$$\min_{x \in \tilde{X}_{1,0}} |\xi-x| = \min\{|\xi-1|, |\xi-7|, |\xi-9|, |\xi-15|\}$$

On the other hand, the set $\tilde{X}_{1,1}$ can be partitioned into two continuous subsets: $\tilde{X}_{1,1} = \{3,5\} \cup \{11,13\}$ $$\min_{x \in \{3,5\}} |\xi - x| = \max\{d', |\xi - 4| - 1\}$$

and from equation 22, $$\min_{x \in \{11,13\}} |\xi - x| = \max\{d', |\xi - 12| - 1\}$$

and from equation 20, $$\min_{x \in \tilde{X}_{1,1}} |\xi - x| = \min\{\max\{d', |\xi - 4| - 1\}, \max\{d', |\xi - 12| - 1\}\}$$

Step 4: Applying both equation 24 and equation 25 the value $\tilde{D}_1$ corresponding to the first bit position is calculated:

$$\tilde{D}_1 = (\min\{|\xi - 1|, |\xi - 7|, |\xi - 9|, |\xi - 15|\})^2 - (\max\{d', \min\{|\xi - 4| - 1, |\xi - 12| - 1\}\})^2, \xi = |z'|$$

The derivation for the next bit position q=2 is analogue to q=1 and the L-values for the other bit positions can be obtained in a very similar way to Example 1. Finally, the L-values for all 8 bit positions in this Example 2 are given by $$\tilde{D}_1 = \min\{|z'|-1, |z'|-7|, |z'|-9|, |z'|-15|\}^2 - \max\{d', \min\{|z'|-4|-1, |z'|-12|-1\}\}^2$$

$$\tilde{D}_2 = \max\{d'', \min\{|z''|-4|-1, |z''|-12|-1\}\}^2 - \min\{|z''|-1, |z''|-7|, |z''|-9|, |z''|-15|\}^2$$

$$\tilde{D}_3 = \min\{|z'|-1, |z'|-3|, |z'|-13|, |z'|-15|\}^2 - \max\{d', |z'|-8|-3\}^2$$

$$\tilde{D}_4 = \min\{|z''|-1, |z''|-3|, |z''|-13|, |z''|-15|\}^2 - \max\{d'', |z''|-8|-3\}^2$$

$$\tilde{D}_5 = \max\{d', |z'|-12|-3\}^2 - \max\{d', |z'|-4|-3\}^2$$

$$\tilde{D}_6 = \max\{d'', |z''|-12|-3\}^2 - \max\{d'', |z''|-4|-3\}^2$$

$$\tilde{D}_7 = \max\{d', |z'-8|-7\}^2 - \max\{d', |z'+8|-7\}^2$$

$$\tilde{D}_8 = \max\{d'', |z''-8|-7\}^2 - \max\{d'', |z''+8|-7\}^2$$

$$D_q = \frac{|h|^2}{N_0} \tilde{D}_q, \quad q = 1, 2, \ldots, 8$$

FIG. 4 shows, the alphabet of QAM with Q=8 used here as an illustrative example to describe the method for the 256-QAM demapping. The bit vectors corresponding to each constellation point are represented as decimal numbers.

Figure 5:
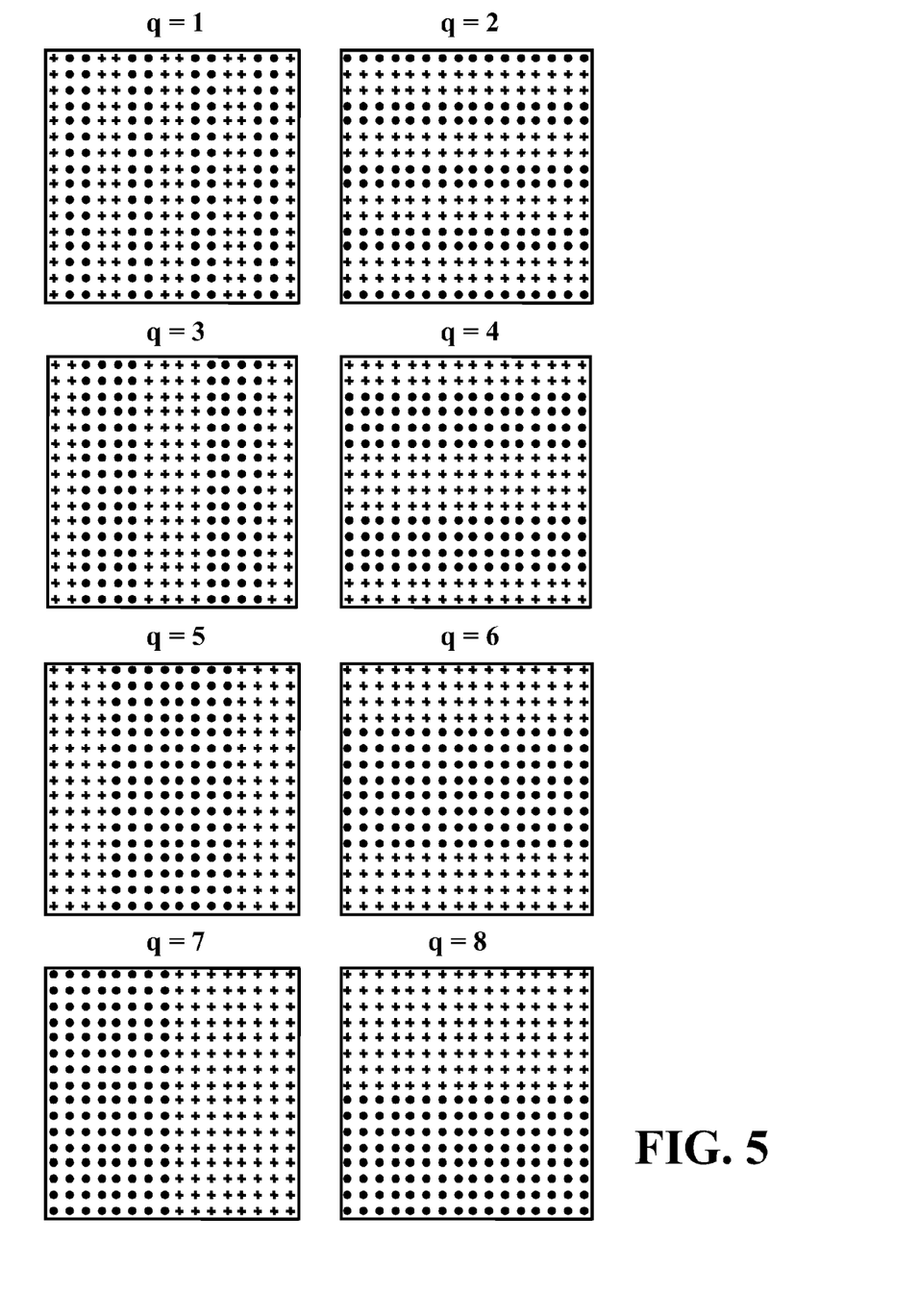
FIG. 5 shows a graphical representation of subconstellations from the 256-QAM constellation with Gray labelling depicted in the previous figure.

FIG. 5 shows the Q=8 subconstellations resulting from partition of the 256-QAM constellation with Gray labelling and, in each subconstellation, crosses denote symbols with the q-th bit $b_q=0$ whilst dots correspond to constellation points with the q-th bit $b_q=1$.

Figure 6:
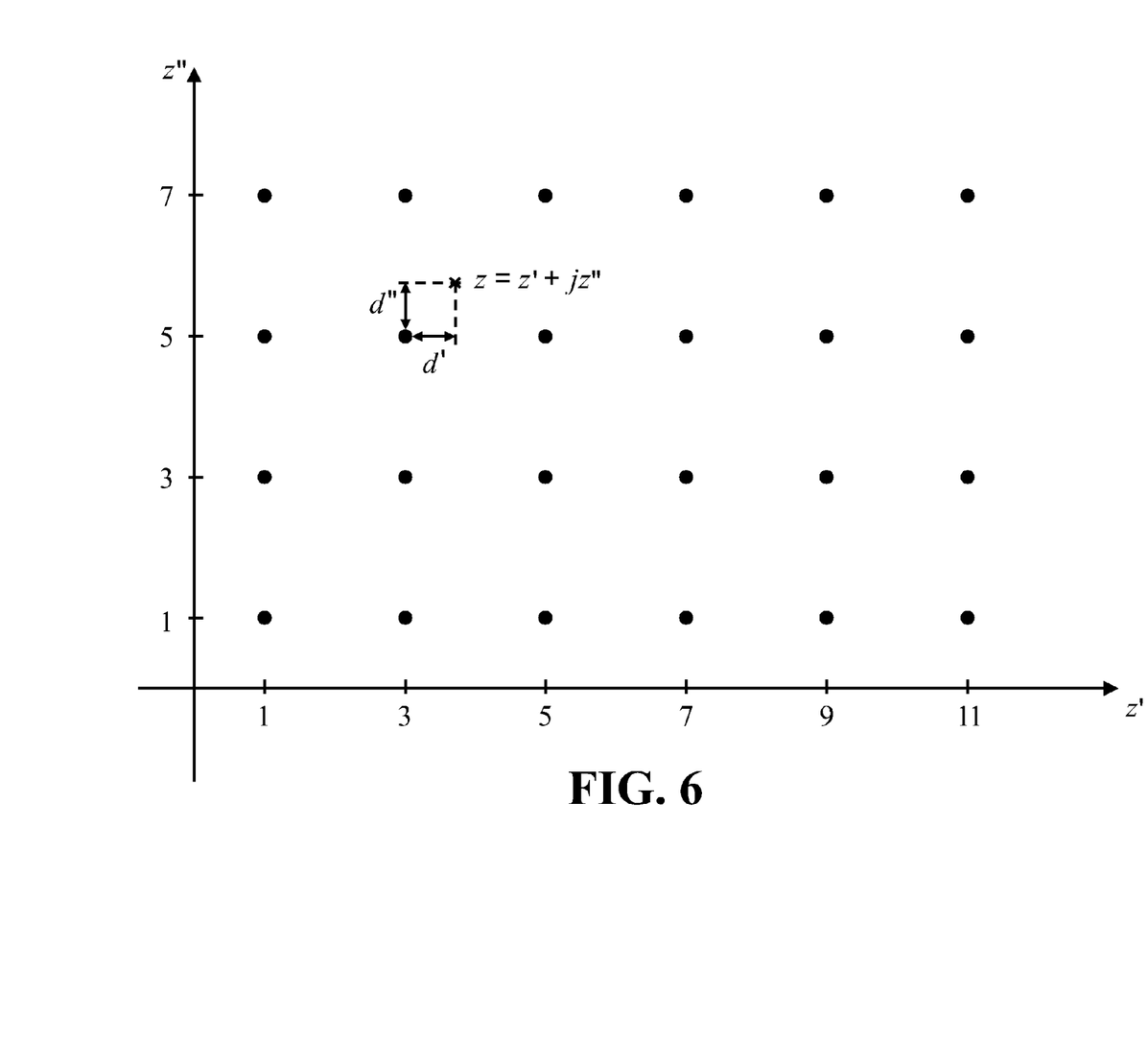
FIG. 6 shows a detail of the rectangular grid used for the distance calculation between the pre-equalized received value and the closest grid point out of the 256-QAM constellation depicted in FIG. 4.

The constellation points for higher-order QAM, as the 256-QAM illustrated in FIG. 4, lie on a rectangular grid. In order to find the point from the rectangular grid, with coordinates (d', d''), which is nearest to a given point that represents the pre-equalized signal (z), consider FIG. 6 and resume the problem to looking for the point out of this rectangular grid which is closest to z=z'+jz''.

Figure 7:
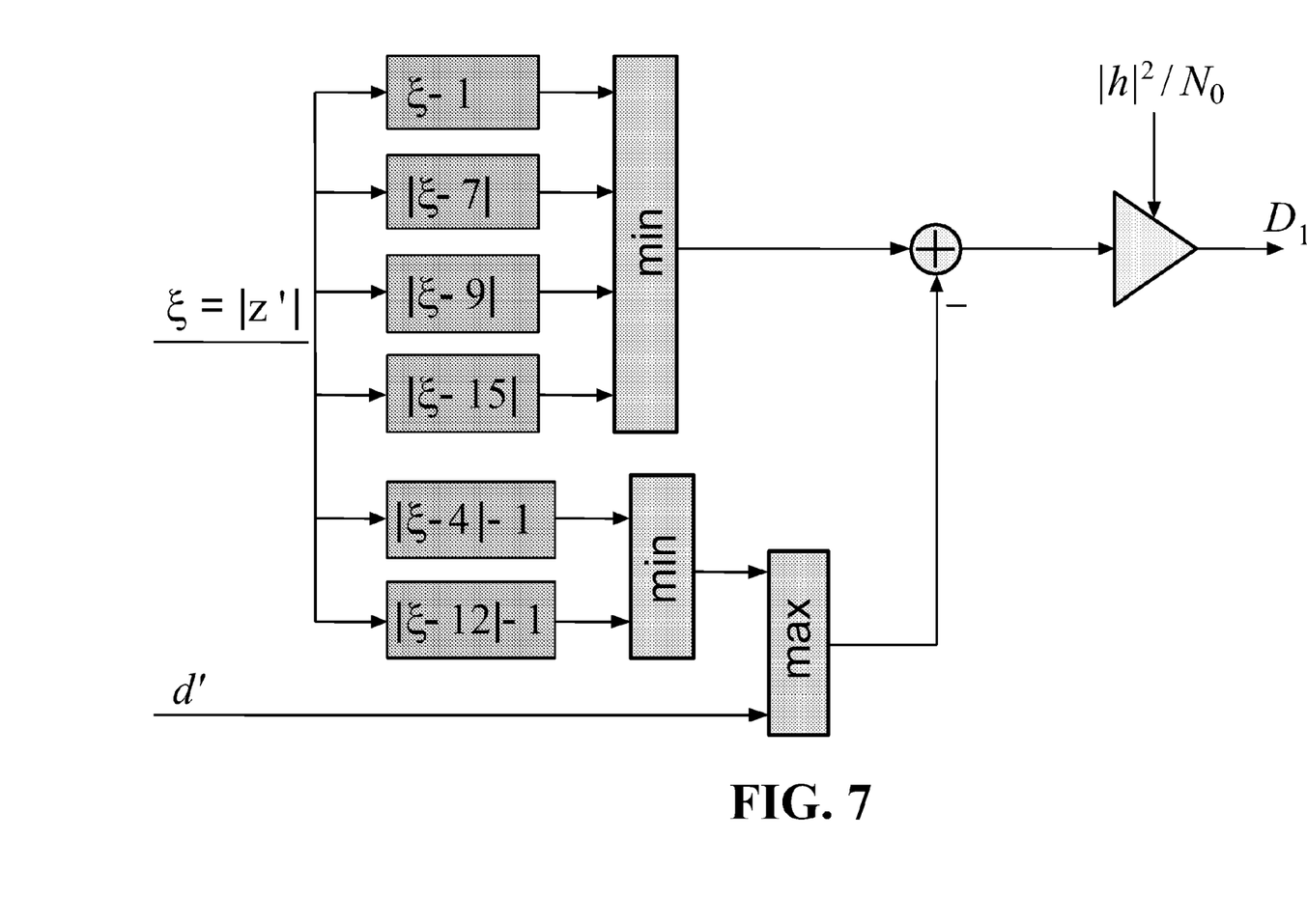
FIG. 7 shows a schematic representation of the implementation of the computation of the L-value for the first bit of a received symbol.

The computation of the L-value for the first bit ($D_1$) of the bit vector that corresponds to one symbol is illustrated in FIG. 7.

The method for calculating the L-values, $D_2, \ldots D_8$, for the other bits of the symbol is done in an analogue way and many intermediate results obtained for the L-value corresponding to the first bit can be re-used for their computation.

Figure 8:
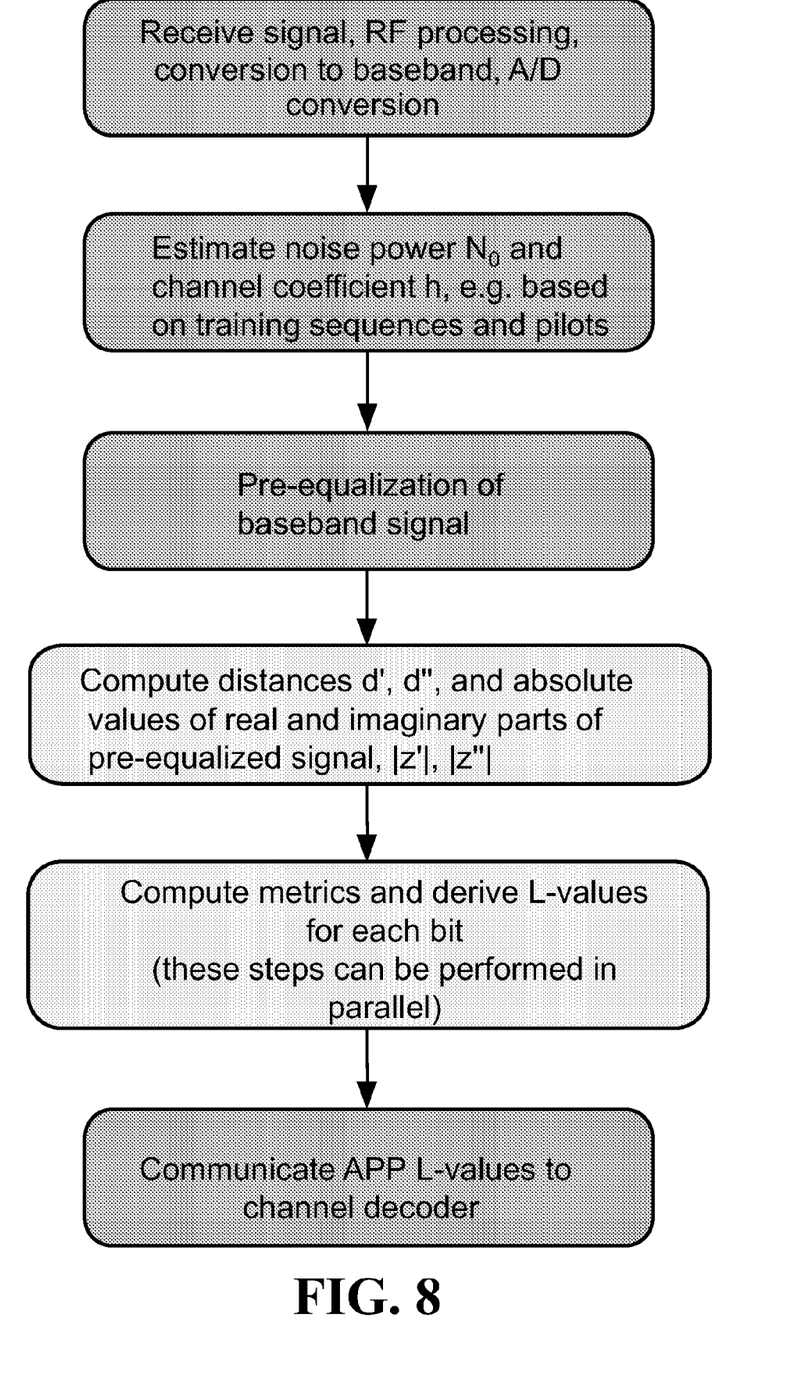
FIG. 8 shows a flow chart of the steps performed by the receiving device depicted in FIG. 2.

FIG. 8 summarizes the steps performed by the receiver including the device shown in FIG. 2. After receiving a signal, generally a radiofrequency —RF—signal, and the need RF processing and conversions to obtain a baseband signal, said baseband signal is pre-equalized with the channel coefficient (h) estimated previously by, for example, using training sequences or signal pilots. From this pre-equalized signal and using the estimated value of noise power ($N_0$), the L-values are determined by this method through first computing the metrics according to FIG. 7, for the first bit and all the resting bits successively or executing the calculations in parallel. The obtained L-values are to be input to the decoder provided in the receiver for extracting the information bits of the expected message.

In this text, the term "comprises" and its derivations (such as "comprising", etc.) should not be understood in an excluding sense, that is, these terms should not be interpreted as excluding the possibility that what is described and defined may include further elements, steps, etc.

The invention is obviously not limited to the specific embodiments described herein, but also encompasses any variations that may be considered by any person skilled in the art (for example, as regards the choice of components, configuration, etc.), within the general scope of the invention as defined in the appended claims.

Some preferred embodiments of the invention are described in the dependent claims which are included next.

The invention claimed is:

1. A method for receiving digital data using QAM symbols, each received symbol (y) corresponding to a number Q of bits determined by an order of QAM modulation used and the QAM symbols being defined in a constellation $C_x$, the method comprising the steps of:
   estimating from the received digital data a noise power ($N_0$) and a channel coefficient (h),
   de-mapping the received symbol (y) to provide soft-information for decoding the received digital data, the de-mapping comprising:
   pre-equalizing the received symbol (y) by the channel coefficient (h) for obtaining a pre-equalized signal (z) determined by a real part (z') and an imaginary part (z");
   calculating a distance from the pre-equalized signal (z) to a certain point of the constellation $C_x$ using the real part (z') and the imaginary part (z") of the pre-equalized signal (z), the calculating the distance including calculating a real coordinate of the distance (d') and an imaginary coordinate of the distance (d") according to the expressions: $d' = |2\lfloor z'/2 \rfloor + 1 - z'|$, $d'' = |2\lfloor z''/2 \rfloor + 1 - z''|$;
   calculating for at least one bit of the received symbol (y) an L-value ($D_q$) using the pre-equalized signal (z) and the calculated distance.

2. The method according to claim 1, wherein the step of de-mapping further comprises:
   calculating respective absolute values (|z'|, |z"|) of the real part (z') and the imaginary part (z") of the pre-equalized signal (z).

3. The method according to claim 1, wherein the step of calculating the L-value ($D_q$) for a bit position q in the received symbol (y), being $q \in \{1, 2, \ldots, Q\}$, comprises:
- calculating a first term $\tilde{D}_q$ of the L-value ($D_q$) using the calculated real part (z') and the imaginary part (z") of the pre-equalized signal (z) and their respective absolute values (|z'|, |z"|), and the real coordinate of the distance (d') and the imaginary coordinate of the distance (d");
- obtaining the L-value ($D_q$) using the calculated first term $\tilde{D}_q$ and the estimated noise power ($N_0$) and the channel coefficient (h) by the equation:

$$D_q = \frac{|h|^2}{N_o} \tilde{D}_q.$$

4. The method according to claim 3, wherein the step of calculating the first term $\tilde{D}_q$ of the L-value ($D_q$) comprises:
- partitioning the constellation $C_x$ into subconstellations $X_{q,0}$ and $X_{q,1}$, being $q \in \{1, 2, \ldots, Q\}$ the bit position in the received symbol (y);
- determining respective sets $X'_{q,0}$ and $X'_{q,1}$ of real parts of the subconstellations $X_{q,0}$ and $X_{q,1}$, and respective sets $X''_{q,0}$ and $X''_{q,1}$ of imaginary parts of the subconstellations $X_{q,0}$ and $X_{q,1}$.

5. The method according to claim 4, wherein the step of calculating the first term $\tilde{D}_q$ of the L-value ($D_q$) further comprises:
- when the sets $X'_{q,0}$ and $X'_{q,1}$ of real parts are equal, calculating $$\left(\min_{x'' \in X''_{q,0}} |z'' - x''|\right)^2 - \left(\min_{x'' \in X''_{q,1}} |z'' - x''|\right)^2 = \tilde{D}_q.$$

6. The method according to claim 5, wherein the step of calculating the first term $\tilde{D}_q$ of the L-value ($D_q$) further comprises:
- partitioning the sets $X''_{q,0}$ and $X''_{q,1}$ of imaginary parts respectively into $K_0$ disjoint subsets $B_{k,0}$ and $K_1$ disjoint subsets $B_{k,1}$, being $B_{k,0} = \{n_{k0}, n_{k0}+2, \ldots, m_{k0}-2, m_{k0}\}$ and $n_{k0}, m_{k0}$ odd integers, $k0=1, \ldots K_0$, and being $B_{k,1} = \{n_{k1}, n_{k1}+2, \ldots, m_{k1}-2, m_{k1}\}$ and $n_{k1}, m_{k1}$ odd integers, $k1=1, \ldots K_1$;
- determining a variable $\xi$ by:

$$\xi = \begin{cases} |z''| & \text{if } X''_{q,i} \text{ is symmetric} \\ z'' & \text{otherwise,} \end{cases}$$

being $i = 0, 1$;
- when $\xi \geq 0$ and $B_{k,i} = \{1, 3\}$, calculating $$\min_{x'' \in X''_{q,i}} |z'' - x''|$$

as:

$$\min_{x'' \in X''_{q,i}} |z'' - x''| = \max\{d(\xi), \xi - 3\}, i = 0, 1.$$

when $B_{k,i}$ has an even number of elements, calculating $$\min_{x'' \in X''_{q,i}} |z'' - x''|$$

as:

$$\min_{x'' \in X''_{q,i}} |z'' - x''| = \max\left\{d(\xi), \left|\xi - \frac{n_{ki} + m_{ki}}{2}\right| - \frac{m_{ki} - n_{ki}}{2}\right\}$$

where $d(\xi)$ is a distance function of the variable $\xi$ defined by:

$$d(\xi) = \left|2\left\lfloor \frac{\xi}{2} \right\rfloor + 1 - \xi\right|.$$

7. The method according to claim 4, wherein the step of calculating the first term $\tilde{D}_q$ of the L-value ($D_q$) further comprises:
- if the sets $X''_{q,0}$ and $X''_{q,1}$ of imaginary parts are equal, calculating $$\left(\min_{x' \in X'_{q,0}} |z' - x'|\right)^2 - \left(\min_{x' \in X'_{q,1}} |z' - x'|\right)^2 = \tilde{D}_q.$$

8. The method according to claim 7, wherein the step of calculating the first term $\tilde{D}_q$ of the L-value ($D_q$) further comprises:
- partitioning the sets $X'_{q,0}$ and $X'_{q,1}$ of real parts respectively into $K_0$ disjoint subsets $B_{k,0}$ and $K_1$ disjoint subsets $B_{k,1}$, being $B_{k,0} = \{n_{k0}, n_{k0}+2, \ldots, m_{k0}-2, m_{k0}\}$ and $n_{k0}, m_{k0}$ odd integers, $k0=1, \ldots K_0$, and being $B_{k,1} = \{n_{k1}, n_{k1}+2, \ldots, m_{k1}-2, m_{k1}\}$ and $n_{k1}, m_{k1}$ odd integers, $k1=1, \ldots K_1$;
- determining a variable $\xi$ by:

$$\xi = \begin{cases} |z'| & \text{if } X'_{q,i} \text{ is symmetric} \\ z' & \text{otherwise,} \end{cases}$$

being $i = 0, 1$;
- when $\xi \geq 0$ and $B_{k,i} = \{1, 3\}$, calculating $$\min_{x' \in X'_{q,i}} |z' - x'|$$

as:

$$\min_{x' \in X'_{q,i}} |z' - x'| = \max\{d(\xi), \xi - 3\}, i = 0, 1;$$

when $B_{k,i}$ has an even number of elements, calculating $$\min_{x' \in X'_{q,i}} |z' - x'|$$

as:

$$\min_{x' \in X'_{q,i}} |z' - x'| = \max\left\{d(\xi), \left|\xi - \frac{n_{ki} + m_{ki}}{2}\right| - \frac{m_{ki} - n_{ki}}{2}\right\}$$

where $d(\xi)$ is a distance function of the variable $\xi$ defined by:

$$d(\xi) = \left|2\left\lfloor\frac{\xi}{2}\right\rfloor + 1 - \xi\right|.$$

9. The method according to claim 1, wherein the order of the QAM modulation used is $Q \geq 6$.

10. A device for receiving digital data using QAM symbols, each received symbol (y) corresponding to a number Q of bits determined by an order of QAM modulation used and the QAM symbols being defined in a constellation $C_x$, comprising a digital demodulator for converting the received symbol (y) into digitized demodulated data, the digital demodulator comprising:
   a channel estimation unit (8) configured to obtain a noise power ($N_o$) and a channel coefficient (h) from the received symbol (y),
   a demapper (5) to provide soft-information from at least one bit of the received symbol (y) and which is input to a deinterleaver (6) and a decoder (7), the de-mapper comprising:
   a pre-equalizer (9) configured to obtain from the received symbol (y) a pre-equalized signal (z) by the channel coefficient (h), the pre-equalized signal (z) having a real part (z') and an imaginary part (z");
   a distance calculation unit connected to the pre-equalizer (9) and configured to compute a distance from the pre-equalized signal (z) to a certain point of the constellation $C_x$ using the real part (z') and the imaginary part (z") of the pre-equalized signal (z), the distance calculation unit comprising calculation means configured to obtain a real coordinate of the distance (d') and an imaginary coordinate of the distance (d") according to the expressions: d'=|2⌊z'/2⌋1+z'|, d"|2⌊z"/2⌋1z"|;
   a soft-information calculation unit configured to compute an L-value ($D_q$) for at least one bit of the received symbol (y), from the pre-equalized signal (z) and the calculated distance.

11. A device according to either claim 10, wherein the demapper (5) comprises calculation means configured to obtain respective absolute values (|z'|, |z"|) of the real part (z') and the imaginary part (z") of the pre-equalized signal (z).

12. A device according to claim 10, wherein the soft-information calculation unit is configured to obtain:
   a first term $\tilde{D}_q$ of the L-value ($D_q$) using the calculated real part (z') and the imaginary part (z") of the pre-equalized signal (z) and their respective absolute values (|z'|, |z"|), and the real coordinate of the distance (d') and the imaginary coordinate of the distance (d");
   and to obtain:
   the L-value ($D_q$) using the calculated first term $\tilde{D}_q$ and the estimated noise power ($N_0$) and the channel coefficient (h) by the equation:

$$D_q = \frac{|h|^2}{N_o}\tilde{D}_q.$$

13. A device according to claim 12, wherein the soft-information calculation unit comprises:
   means for partitioning the constellation $C_x$ into subconstellations $X_{q,0}$ and $X_{q,1}$, being q∈{1, 2, . . . , Q} the bit position in the received symbol (y);
   means for determining respective sets $X'_{q,0}$ and $X'_{q,1}$ of real parts of the subconstellations $X_{q,0}$ and $X_{q,1}$, and respective sets $X''_{q,0}$ and $X''_{q,1}$ of imaginary parts of the subconstellations $X_{q,0}$ and $X_{q,1}$;
   means for comparing the sets $X'_{q,0}$ and $X'_{q,1}$ of real parts and means for comparing the sets $X''_{q,0}$ and $X''_{q,1}$ of imaginary parts.

14. A device according to claim 13, wherein the soft-information calculation unit is configured to obtain the first term $\tilde{D}_q$ of the L-value ($D_q$) by:
   calculating $$\left(\min_{x'' \in X''_{q,0}} |z'' - x''|\right)^2 - \left(\min_{x'' \in X''_{q,1}} |z'' - x''|\right)^2 = \tilde{D}_q,$$

if the sets $X'_{q,0}$ and $X'_{q,1}$ of real parts are equal; and
   calculating $$\left(\min_{x' \in X'_{q,0}} |z' - x'|\right)^2 - \left(\min_{x' \in X'_{q,1}} |z' - x'|\right)^2 = \tilde{D}_q,$$

if the sets $X''_{q,0}$ and $X''_{q,1}$ of imaginary parts are equal.

15. A device according to claim 14, wherein the soft-information calculation unit further comprises:
   means for partitioning the sets $X'_{q,0}$ and $X'_{q,1}$ of real parts and the sets $X''_{q,0}$ and $X''_{q,1}$ of imaginary parts, being said means for partitioning configured to partition:
   the sets $X''_{q,0}$ and $X''_{q,1}$ of imaginary parts respectively into $K_0$ disjoint subsets $B_{k,0}$ and $K_1$ disjoint subsets $B_{k,1}$, being $B_{k,0}=\{n_{k0}, n_{k0}+2, \ldots, m_{k0}-2, m_{k0}\}$ and $n_{k0}$, $m_{k0}$ odd integers, k0=1, . . . $K_0$, and being $B_{k,1}=\{n_{k1}, n_{k1}+2, \ldots, m_{k1}-2, m_{k1}\}$ and $n_{k1}$, $m_{k1}$ odd integers, k1=1, . . . $K_1$, if the sets $X'_{q,0}$ and $X'_{q,1}$ of real parts are equal; and
   the sets $X'_{q,0}$ and $X'_{q,1}$ of real parts respectively into $K_0$ disjoint subsets $B_{k,0}$ and $K_1$ disjoint subsets $B_{k,1}$, being $B_{k,0}=\{n_{k0}, n_{k0}+2, \ldots, m_{k0}-2, m_{k0}\}$ and $n_{k0}$, $m_{k0}$ odd integers, k0=1, . . . $K_0$, and being $B_{k,1}=\{n_{k1}, n_{k1}+2, \ldots, m_{k1}-2, m_{k1}\}$ and $n_{k1}$, $m_{k1}$ odd integers, k1=1, . . . $K_1$, if the sets $X''_{q,0}$ and $X''_{q,1}$ of imaginary parts are equal.

16. A device according to claim 15, wherein the soft-information calculation unit is configured to calculate $$\min_{x'' \in X''_{q,i}} |z'' - x''|,$$

if the sets $X'_{q,0}$ and $X'_{q,1}$ of real parts are equal, by:
   determining a variable $\xi$ by:

$$\xi = \begin{cases} |z''| & \text{if } X''_{q,i} \text{ is symmetric} \\ z'' & \text{otherwise,} \end{cases}$$

being i=0,1;

when $\xi \geq 0$ and $B_{k,i}=\{1,3\}$, calculating $$\min_{x'' \in X''_{q,i}} |z'' - x''|$$

as:

$$\min_{x'' \in X''_{q,i}} |z'' - x''| = \max\{d(\xi), \xi - 3\},$$

i=0,1;

when $B_{k,i}$ has an even number of elements, calculating $$\min_{x'' \in X''_{q,i}} |z'' - x''| = \max\left\{d(\xi), \left|\xi - \frac{n_{ki}+m_{ki}}{2}\right| - \frac{m_{ki}-n_{ki}}{2}\right\}$$

where $d(\xi)$ is a distance function of the variable $\xi$ defined by:

$$d(\xi) = \left|2\left\lfloor\frac{\xi}{2}\right\rfloor + 1 - \xi\right|.$$

17. A device according to claim 15, wherein the soft-information calculation unit is configured to calculate $$\min_{x' \in X'_{q,i}} |z' - x'|,$$

if the sets $X''_{q,0}$ and $X''_{q,1}$ of imaginary parts are equal, by: determining a variable $\xi$ by:

$$\xi = \begin{cases} |z'| & \text{if } X'_{q,i} \text{ is symmetric} \\ z' & \text{otherwise,} \end{cases}$$

being i=0,1;

when $\xi \geq 0$ and $B_{k,i}=\{1,3\}$, calculating $$\min_{x' \in X'_{q,i}} |z' - x'|$$

as:

$$\min_{x' \in X'_{q,i}} |z' - x'| = \max\{d(\xi), \xi - 3\},$$

i=0,1;

when $B_{k,i}$ has an even number of elements, calculating $$\min_{x' \in X'_{q,i}} |z' - x'| = \max\left\{d(\xi), \left|\xi - \frac{n_{ki}+m_{ki}}{2}\right| - \frac{m_{ki}-n_{ki}}{2}\right\}$$

where $d(\xi)$ is a distance function of the variable $\xi$ defined by:

$$d(\xi) = \left|2\left\lfloor\frac{\xi}{2}\right\rfloor + 1 - \xi\right|.$$

18. A device according to claim 10, wherein the soft-information calculation unit is configured to compute the L-value ($D_g$) for at least one bit of the received symbol (y) corresponding to a number $Q \geq 6$ of bits.

\* \* \* \* \*